Feb. 2, 1926.  
H. W. KRAMER  
1,571,551  
DETACHABLE HANDLE AND ATTACHING MEANS FOR WOODEN BASKETS  
Filed Oct. 1, 1925
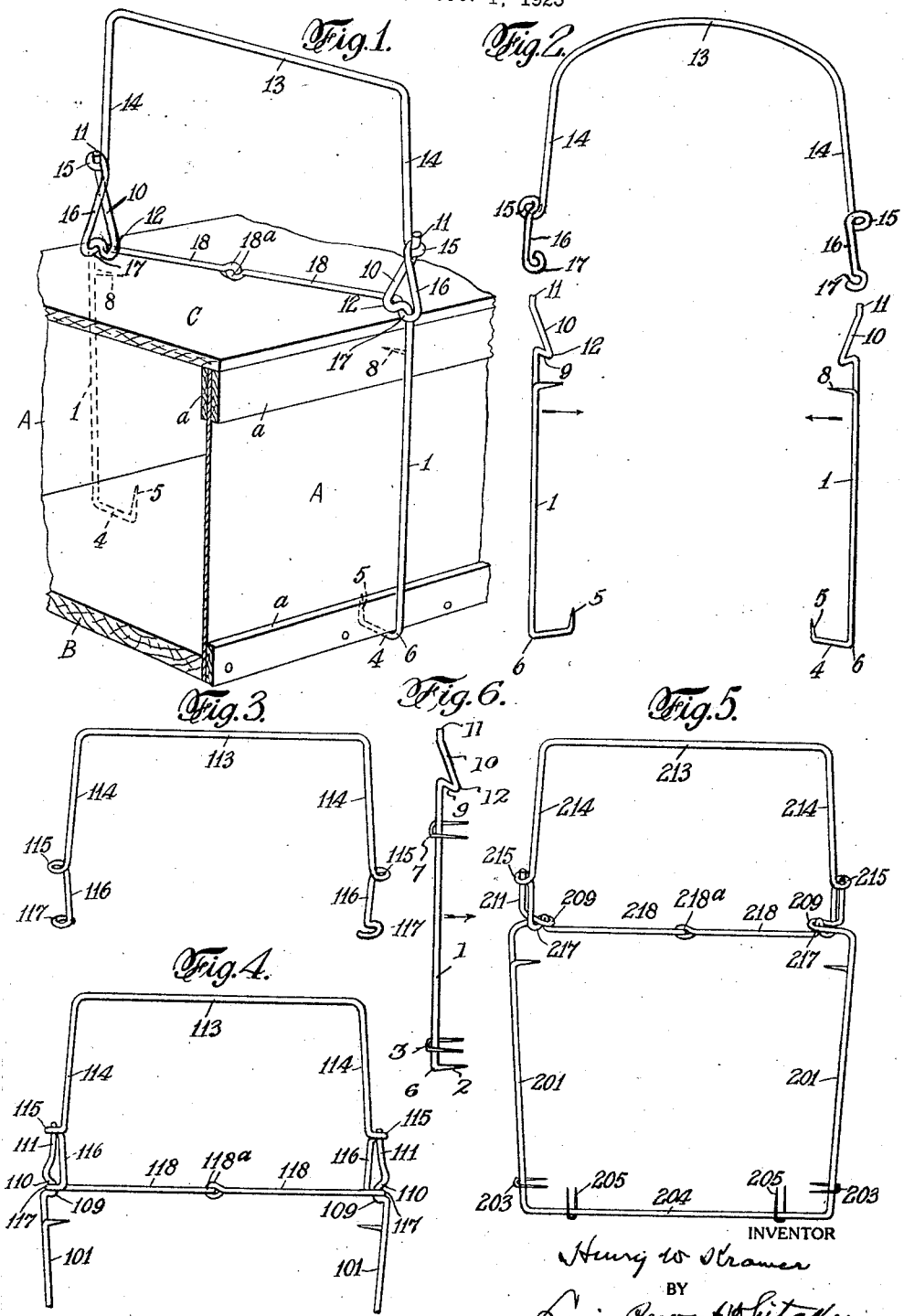
INVENTOR  
Henry W. Kramer  
BY  
Louis Prevost Whitaker  
ATTORNEY Patented Feb. 2, 1926.

1,571,551

UNITED STATES PATENT OFFICE.

HENRY W. KRAMER, OF KINGSTON, NEW YORK, ASSIGNOR OF ONE-HALF TO RALPH P. YOUNG, OF MARLBORO, NEW YORK.

DETACHABLE HANDLE AND ATTACHING MEANS FOR WOODEN BASKETS.

Application filed October 1, 1925. Serial No. 59,811.

*To all whom it may concern:*

Be it known that I, HENRY W. KRAMER, a citizen of the United States, residing at Kingston, in the county of Ulster and State of New York, have invented certain new and useful Improvements in Detachable Handles and Attaching Means for Wooden Baskets; and I do hereby declare the following to be a full, clear, and exact description of the invention, such as will enable others skilled in the art to which it appertains to make and use the same.

My invention consists in the novel features hereinafter described, reference being had to the accompanying drawing, which illustrates several embodiments of the same, selected by me for purposes of illustration, and the said invention is fully disclosed in the following description and claims.

The object of my invention is to provide a metallic handle for supporting and carrying a wooden basket of the type ordinarily used for holding and transporting grapes and other fruit, vegetables, etc. As ordinarily constructed, such baskets are usually provided with handles formed of a thin strip of veneer bent into inverted U-form, and secured to the sides of the basket by tacks or staples. These handles are very much in the way in the packing of baskets, and preparing them for shipment, as they prevent nesting of the baskets and the handles are frequently broken or detached from the baskets, with consequent loss, not only of the basket, but its contents. The object of my invention is to provide a metal handle formed, preferably of wire or rod, circular in cross section, and preferably of iron or steel, having a certain degree of resiliency, and having a bail member separate from the members which engage the sides of the basket, so that the side engaging members may, if desired, be attached to the basket at the factory where the latter is constructed, and yet permit the baskets to be nested for shipment to the point where they are filled, the bail members for the baskets being transported with the nested baskets and covers, and being applied to the baskets either before they are filled, or after they are filled, as preferred, usually before they are filled, so that the baskets may be readily handled by the operators who pack them. My improved handle also provides means for rigidly connecting the bail member to the side members, which are attached to the basket so that they cannot become accidentally disassociated, and also provide means for reinforcing the basket transversely of its width to prevent spreading of the basket by the contents, and also provide means for securing the cover against accidental displacement.

Referring to the accompanying drawings, which illustrate several embodiments in which I have contemplated embodying my invention, selected by me for purposes of illustration, Fig. 1 represents a perspective view, partly in section, of a portion of a basket showing the completed handle attached thereto in operative position, and holding the basket cover against accidental displacement.

Fig. 2 represents a detail view of the parts of the handle structure in separated relation with the connecting extensions removed.

Fig. 3 is a perspective view showing a slight modification of the bail portion of the handle.

Fig. 4 is an elevation of the same in operative relation with lateral or side portions of the handle, constructed to cooperate therewith and including the connecting extensions.

Fig. 5 is a perspective view of another slightly modified form of my improved handle.

Fig. 6 is a side elevation of a modified type of side member.

In carrying my invention into effect, my improved handle is preferably made of three pieces, each formed ordinarily of round iron or steel wire, having a certain degree of resiliency, of the desired gauge to give the necessary strength and rigidity to the parts. The three parts are respectively two lateral or side members and the detachable lift or bail member. In the preferred form of my invention illustrated in Figs. 1 and 2, for example, 1, 1, represent vertical side members, which are to be applied to the sides of the basket. To this end, they are each provided at the lower end and at a point adjacent to the upper end, with means for attaching them to the basket. In some instances the side members, 1, are provided at the bottom with laterally projecting points, indicated at 2, which may be driven through the side into the bottom of the basket. I have indicated, in partial section, a basket in Fig. 1, having the bottom, B, the sides, A, which may be provided with reinforcing strips, a, and the cover, C, all of which are of usual form, and constitute no part of my present invention. Where the straight securing point, as 2, is employed, this may be supplemented by the use of a staple, shown at 3, to prevent the accidental disengagement of the point, 2, if this is found necessary or desirable. In some instances, instead of using the horizontally disposed point, 2, I may provide the lower end of the side members, with a horizontal arm, 4, terminating in an upwardly extending point, 5, to be driven upward into the bottom, B, of the basket, in the manner indicated in Fig. 1, for example, in which case the staple, 3, would be unnecessary. In either case the angle indicated at 6, at the lower end of the side member, 1, is preferably made an acute angle, so that when the lower end of the side member is secured in position, it is given an inward spring in the direction of the arrows in Fig. 2, which has a tendency to compress the central portion of the basket adjacent to the upper edge of the side, and prevent spreading thereof by the contents of the basket. Adjacent to the upper end of each side member, 1, it is provided with means for attaching it to the side of the basket, which may be, for example, a staple indicated at 7, as shown at the left in Fig. 2, driven in and clinched on the inside of the side, A, or in some instances, I may employ a lateral projection or point, 8, as shown in Fig. 1, and at the right in Fig. 2, which may be driven through the side of the basket and clinched. The upper ends of the side members and the lower ends of the bail member, are provided with interengaging portions comprising guiding portions and locking portions for securing the bail member rigidly to the side members, and these interengaging parts are preferably so constructed that they will be sprung into operative engagement and be retained by the inherent resiliency of the material of which they are composed. The upper end of each of the side members is provided with an inwardly and downwardly bent portion, indicated at 9, which is so located as to extend over the cover, C, when the latter is in operative position, and forming a locking shoulder, and the side member is also provided with an upwardly and outwardly extending portion, indicated at 10, preferably terminating in a vertical guiding portion, indicated at 11. The junctions of the portions, 9 and 10, provide an elbow or bend, indicated at 12, which is so arranged as to engage the cover and hold it in closed position against accidental displacement. It will be seen that these side members may be made independently of the bail member, hereinafter described, and attached to the basket at the factory where the latter is manufactured, if desired, and that as there is normally a slight flare to these baskets, equal to the inward projection of the portion, 9, of the side members, these portions of the side members will not interfere with the nesting of the baskets, and as a matter of fact, with these side members applied, they may be readily nested in any desired number, as for example, 25 baskets to a nest, or other number, as preferred.

The lifting portion of the handle, which is a separate part, comprises the member, 13, having downwardly extending portions, 14, and which may be of rectangular form, as indicated in Fig. 1, or of curved or arched form, as indicated in Fig. 2. The downwardly extending portions, 14, are each provided with a horizontally disposed guiding loop, indicated at 15, adapted to pass over the upper end, 11, of the adjacent side member, and below said loop there is an outwardly extending portion, indicated at 16, provided with a locking portion, or hook, 17, in this instance disposed horizontally, which is adapted to pass beneath the inwardly and downwardly bent locking shoulder, 9, of the side member, between it and the cover, so as to lock the handle firmly to the side members, and also assist in holding down the cover. In some instances, I prefer, in order to further strengthen and reinforce the basket transversely, at its central portion where the handle is applied, to provide the hook or locking portions, 17, with extensions, indicated at 18, which are connected centrally to each other by interlocking loops, 18ª, or otherwise. If it is desired to cheapen the construction, further, these extensions, 18, may be omitted, as indicated in Fig. 2. It will be seen, however, that the direct connection of the lower ends of the arms, 14, of the bail or lifting member, by what is practically a cross bar formed by the connected extensions, 18—18, a very rigid support for the central portion of the basket adjacent to its upper edge will be provided, and further, this construction assists in retaining the cover in its closed position against accidental displacement. It is to be understood that there is a sufficient spring in the upwardly extending portions, 10, of the side members, or in the arms, 14, of the bail member, or both, so that the handle can be placed with the loops, 15, in guiding engagement with the portions, 11, of the side members, and pressed downwardly until the hook portions, 17, catch under the shoulders, 9, of the side members, thereby locking the handle in operative position. Even where the connected extensions, 18, are employed, there will be a slight yield in the lower portions of the bail arms, 14, and there will always be sufficient resiliency in the upwardly extending portions, 10, of the side members to enable the bail member to be snapped into place. When it is once secured to the side members, 1, 1, in the manner described, it cannot be disengaged therefrom accidentally, and will permit the basket, whether the cover is in place or not, to be handled readily in any position, and will not only support the basket either with or without its contents, but will also hold the cover in place after the basket has been filled and the cover applied.

In Figs. 3 and 4, I have shown a slightly modified form of my invention, in which the side members, here indicated at 101, are provided with inwardly extending shoulders, 109, in position to engage and retain the basket cover above which the wire forming the side member, is given an outward bend, 110, to form a locking shoulder, above which is the nearly vertical guiding portion, 111. The bail member, in this instance indicated at 113, is provided with side arms, 114, having guiding loops, 115, adapted to engage the upper ends of the guiding portions, 111, of the side members, and having the outwardly extending portions, 116, terminating in the hook portions, 117, which in this instance engage beneath the locking shoulders, 110, of the respective side members, as clearly shown in Fig. 4, said hook portions being provided with extensions, 118, connected by interengaging loops, 118ª, and forming a transverse brace for the basket when the handle is forced down, in the manner previously described, into operative position. In some instances the extensions, 118, may be dispensed with, as indicated in Fig. 3, for example.

In Fig. 5 I have illustrated another modification of the invention, in which the side members, indicated at 201, are provided at their upper ends with a loop, 209, preferably disposed vertically and so arranged that the lower portion of the loop will bear on the cover of the basket, and hold it in closed position, the upper portion of the loop forming a locking shoulder, each side member being provided with a guiding portion, 211, extending substantially vertically above said loop. The bail member of the handle, in this instance indicated at 213, has its side arms, 214, provided with guiding loops, 215, to engage the vertically disposed guiding portions, 211, of the side members, and is provided with locking hook portions, 217, which hook into the loops, 209, respectively of the side members, so as to give the desired upward pull on said loops when the hand engaging portion, 213, of the device is grasped. The locking hook portions, 217, may also be provided with extensions, 218, connected centrally by interengaging loops, 218ª, for the purpose of providing a cross brace for the basket, if desired, or these extensions may be omitted as preferred.

In some instances I may prefer to form the side members from a single piece of wire, and I have shown such a construction in Fig. 5, in which the side members, 201, are integral with a horizontal portion, 204, extending across the bottom of the basket. In this instance, the side members may be secured to the basket near the bottom by lateral staples, 203, extending through the sides and into the bottom, or the bottom staples, 205, extending vertically upward into the bottom, and in either case, surrounding the wire or rod, from which the device is made. The bends connecting the side members with the bottom bar are so made that the upper ends of the side members tend to brace the sides of the basket inwardly. It is also to be understood that any of the forms of side members indicated in the other figures of the drawing, may be made in this manner if it is preferred, and found desirable to do so.

The handle can be applied to the basket at any time, but it is considered especially desirable to apply the side engaging members at the factory where the basket is constructed, and it will readily be seen that the baskets may be nested as before described, and shipped with the requisite number of lids and bails or lifting members, to the place where they are to be filled, where the packers can quickly attach the bail members to the baskets, and fill the same, after which the cover is ordinarily slid lengthwise into closed position, underneath the retaining shoulders of the side members, and the transverse brace provided by the hook extensions hereinbefore referred to of the bail or lifting member, in case they are employed. When the bail portions are once snapped into position in engagement with the upper ends of the side engaging members, it becomes rigidly connected thereto, so that the bail member is maintained at all times in a vertical position and cannot be accidentally disengaged therefrom by any ordinary, or even severe, usage. I prefer to so form the engaging portions of the side members and bail member, that when they are brought into operative engagement, they will be sprung slightly out of their normal positions, and be retained in engagement by their inherent resiliency.

By my improved construction, a very cheap and efficient handle for baskets of this kind is provided, which will permit portions of the same to be attached to the basket at the factory, if desired, without interfering with the nesting of the baskets for transportation.

What I claim and desire to secure by Letters Patent is:—

1. A handle for wooden baskets comprising side engaging members provided with vertically disposed portions adapted to extend above the top of the basket, and having a locking shoulder below the upper end thereof, of a separately formed bail member having guiding portions for engaging the vertically disposed projecting portions of the side members, and hook portions adapted to engage said shoulders of the side members, whereby said bail member when engaged with said side members, is rigidly connected thereto and maintained at all times in a substantially vertical position.

2. A handle for wooden baskets comprising side members adapted to be secured to the sides of the basket, and a separately formed bail member, the upper ends of said side members and the lower ends of said bail member being provided, one with portions having a guiding engagement with the other, and the other with hook portions for engaging a locking shoulder on the other.

3. A handle for wooden baskets comprising side members adapted to be secured to the sides of the basket, and a separately formed bail member, the upper ends of said side members and the lower ends of said bail member being provided, one with portions having a guiding engagement with the other, and the other with hook portions for engaging a locking shoulder on the other, the engaging portions of said bail and side members being formed of material having a certain amount of resiliency, and said guiding and interlocking portions being so constructed that they will be held against accidental disengagement by the natural resiliency of the material of which said members are composed, to rigidly hold the bail member in engagement with the side members and support the bail member in substantially vertical position.

4. A handle for wooden baskets formed of metal rod having a certain amount of resiliency, and comprising side engaging members having vertically disposed guiding portions, and substantially horizontally disposed locking shoulders, and a separately formed bail member having its lower ends provided with loops for engaging the guiding portions of the side members, and hooks for engaging the locking shoulders to hold said parts rigidly in engagement and maintain the bail member in vertical position at all times, interengaging parts of the side pieces and bail member being so constructed as to be retained in interengaged position by the resiliency of the material of which they are formed.

5. A handle for wooden baskets, comprising among its members, side engaging members having inwardly extending portions adapted to engage and retain the cover and forming a locking shoulder adjacent thereto, and a vertically disposed guiding portion, and a separately formed bail member provided with loops for engaging said guiding portions, and hook portions for engaging said locking shoulders.

6. A handle for wooden baskets, comprising side engaging members, each having a portion extending inwardly with respect to the basket to form a locking shoulder and also a cover retaining portion, and having a vertically disposed guiding portion extending upwardly therefrom, and a separately formed bail member provided with horizontally disposed loop portions for engaging the vertically disposed portions of the side members, and hook portions adapted to engage the under sides of said locking shoulders between them and the cover, and assist in holding the cover in position.

7. A handle for wooden baskets comprising side engaging members, each provided with a locking shoulder, and vertically disposed guiding members above the same, and a separately formed bail member having guiding portions for engaging the vertically disposed portions of the side members, and hook portions to engage said locking shoulders thereof, the lower ends of said bail member being connected transversely of the basket so that when the bail member is placed into position with respect to the side members, the basket will be positively prevented from spreading.

8. A handle for wooden baskets comprising side engaging members, each provided with a locking shoulder, and vertically disposed guiding members above the same, and a separately formed bail member having guiding portions for engaging the vertically disposed portions of the side members, and hook portions to engage said locking shoulders thereof, hook portions having extensions connecting them to each other and forming a transverse brace for the basket when the bail member is in operative position.

In testimony whereof I affix my signature.

HENRY W. KRAMER.